US011449794B1

(12) United States Patent
Diao

(10) Patent No.: US 11,449,794 B1
(45) Date of Patent: *Sep. 20, 2022

(54) AUTOMATIC CHARSET AND LANGUAGE DETECTION WITH MACHINE LEARNING

(71) Applicant: Trend Micro Incorporated, Tokyo (JP)

(72) Inventor: Lili Diao, Nanjing (CN)

(73) Assignee: Trend Micro Incorporated, Tokyo (JP)

(*) Notice: Subject to any disclaimer, the term of this patent is extended or adjusted under 35 U.S.C. 154(b) by 467 days.

This patent is subject to a terminal disclaimer.

(21) Appl. No.: 16/547,211

(22) Filed: Aug. 21, 2019

Related U.S. Application Data

(63) Continuation of application No. 11/238,351, filed on Sep. 28, 2005, now abandoned.

(51) Int. Cl.
*G06N 20/00* (2019.01)
*G06F 40/16* (2020.01)
*G06F 40/30* (2020.01)

(52) U.S. Cl.
CPC ............. *G06N 20/00* (2019.01); *G06F 40/16* (2020.01); *G06F 40/30* (2020.01)

(58) Field of Classification Search
None
See application file for complete search history.

(56) References Cited

PUBLICATIONS

Brown, Finding and Identifying Text in 900+ Languages, Digital Investigation 9, 2012, pp. S34-S43 (Year: 2012).*

* cited by examiner

*Primary Examiner* — Wilbert L Starks
(74) *Attorney, Agent, or Firm* — Beyer Law Group LLP

(57) ABSTRACT

Language-based machine learning approach for automatically detecting universal charset and the language of a received document is disclosed. The language-based machine learning approach employs a plurality of text document samples in different languages, after converting them to a selected Unicode style (if their original encoding schemes are not the selected Unicode), to generate a plurality of language-based machine learning models during the training stage. During the application stage, vector representations of the received document for different combinations of charsets and their respective applicable languages are tested against the plurality of machine learning models to ascertain the charset and language combination that is most similar to its associated machine learning model, thereby identifying the charset and language of the received document.

34 Claims, 4 Drawing Sheets

AUTOMATIC CHARSET AND LANGUAGE DETECTION WITH MACHINE LEARNING

CROSS-REFERENCE TO RELATED APPLICATION(S)

The present application is a continuation of U.S. patent application Ser. No. 11/238,351, filed Sep. 28, 2005, entitled "Automatic Charset and Language Detection with Machine Learning," the disclosure of which is hereby incorporated by reference.

BACKGROUND OF THE INVENTION

Computers have long employed a variety of encoding schemes to represent various writing scripts/characters for computer data. As Internet usage spreads across the globe, there is an acute need to exchange information across language and regional boundaries. However, global information exchange has been hampered by the proliferation of different regional coding schemes.

When data is exchanged between two applications that support multiple encoding schemes, it has been necessary to correctly detect the encoding scheme with which the received data is encoded before the data can be properly utilized and/or displayed. Consider, for example, the situation wherein a computer receives data to be displayed in a web browser. In order to correctly display the data received, the browser initially tries to rely on the encoding information provided by the http server, the web page and/or the end user. This encoding information may be provided via a character-encoding menu, for example. Unfortunately, this type of encoding information is often missing from many http servers and web pages. Moreover, the typical user is generally not sufficiently technical to be able to always provide the encoding information via a character-encoding menu. Without this encoding information, web pages are sometimes displayed as 'garbage' characters, and users are unable to access the desired information and/or functionalities.

As can be appreciated from the above example, in order to properly display the content (word and/or sentences) of a received document, the encoding scheme of that received document needs to be ascertained so that the content can be decoded using the proper decoding scheme. In situations wherein the encoding scheme information is not explicitly provided, an automatic charset (encoding) detection mechanism that can accurately ascertain the proper encoding scheme for use with the received document is highly useful. With reference to the above-discussed browser example, many internet browsers have implemented their versions of automatic charset detection. With such an automatic charset detection mechanism, a web browser can make an educated guess as to the encoding scheme employed when the data is transmitted, and employ that encoding scheme to attempt to display the information received on the browser screen.

Another useful application of automatic charset (encoding) detection is in the area of anti-spam and content filtering of emails. Spam emails are generally bulk electronic unsolicited messages, which are sent by advertisers but tend to be universally detested by recipients. Some users may desire advance filtering of emails based on their contents for the purpose of, for example, properly categorizing or prioritizing the received emails. Content filtering may also be employed to prevent emails that contain offensive and/or malicious content from reaching users. Spam prevention and content-filtering are among the more desirable features offered to email users by email systems and providers.

To perform the anti-spam and/or content filtering function on an incoming email, the content of the email (e.g., words or sentences) needs to be analyzed to discern whether the received email is spam. Alternatively or additionally, the content of the received email may also be examined to determine the email's topic category (e.g., sports, social life, economics, etc.) and/or whether its content is offensive/malicious.

In the above examples, automatic charset detection of received document permits the received document to be correctly decoded for display. Once the received document is properly decoded, some degree of analysis of the content is also possible (e.g., keyword search). However, in-depth analysis of the content of the received document (e.g., semantic analysis, content filtering and categorization, content recommendation and summarizing, etc.) may require, in addition to charset detection, that the language of the received document be ascertained. Language detection is a different problem from charset detection since, for example, multiple languages may be represented by a single charset and/or a single language may be represented by different charsets. In the earlier case, French, Spanish, German, etc., may be represented by the ISO8859-1 charset, for example. In the latter case, Chinese Simplified Language may be represented by the GB2312, GB18030, EUC-CN, HZ, UTF-16 charsets, for example. Accordingly, the relationship between languages and charsets tends to be difficult to ascertain. In practice, it has been found in many cases that languages tend to be more difficult to identify than charsets. Yet, the accurate identification of both the language and the charset of a received document is a critical requirement in many applications.

In view of the foregoing, arrangements and techniques for automatically detecting both the charset and the language of received documents are highly desirable.

SUMMARY OF INVENTION

The invention relates, in an embodiment, to a computer-implemented method for automatically detecting a received document charset and a received document language of a received document. The method includes training, using a plurality of text document samples that are in a plurality of languages, to generate a set of language-based machine learning models for the plurality of languages. The training includes converting documents of the plurality of text documents samples in different languages to a selected Unicode style if the documents of the plurality of text documents are not already in the selected Unicode style. The training also includes generating the set of language-based machine learning models from selected Unicode-style version of the plurality of text document samples. The method further includes performing an application stage which includes processing the received document to ascertain the received document charset and the received document language using the set of machine learning models. The processing includes testing vector representations of the received document for different combinations of charsets and their applicable languages against the set of language-based machine learning models to ascertain the charset and language combination that is most similar to its associated machine language model, whereby the charset and language combination that is most similar to its associated machine language model are designated as the received document charset and the received document language of the received document These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
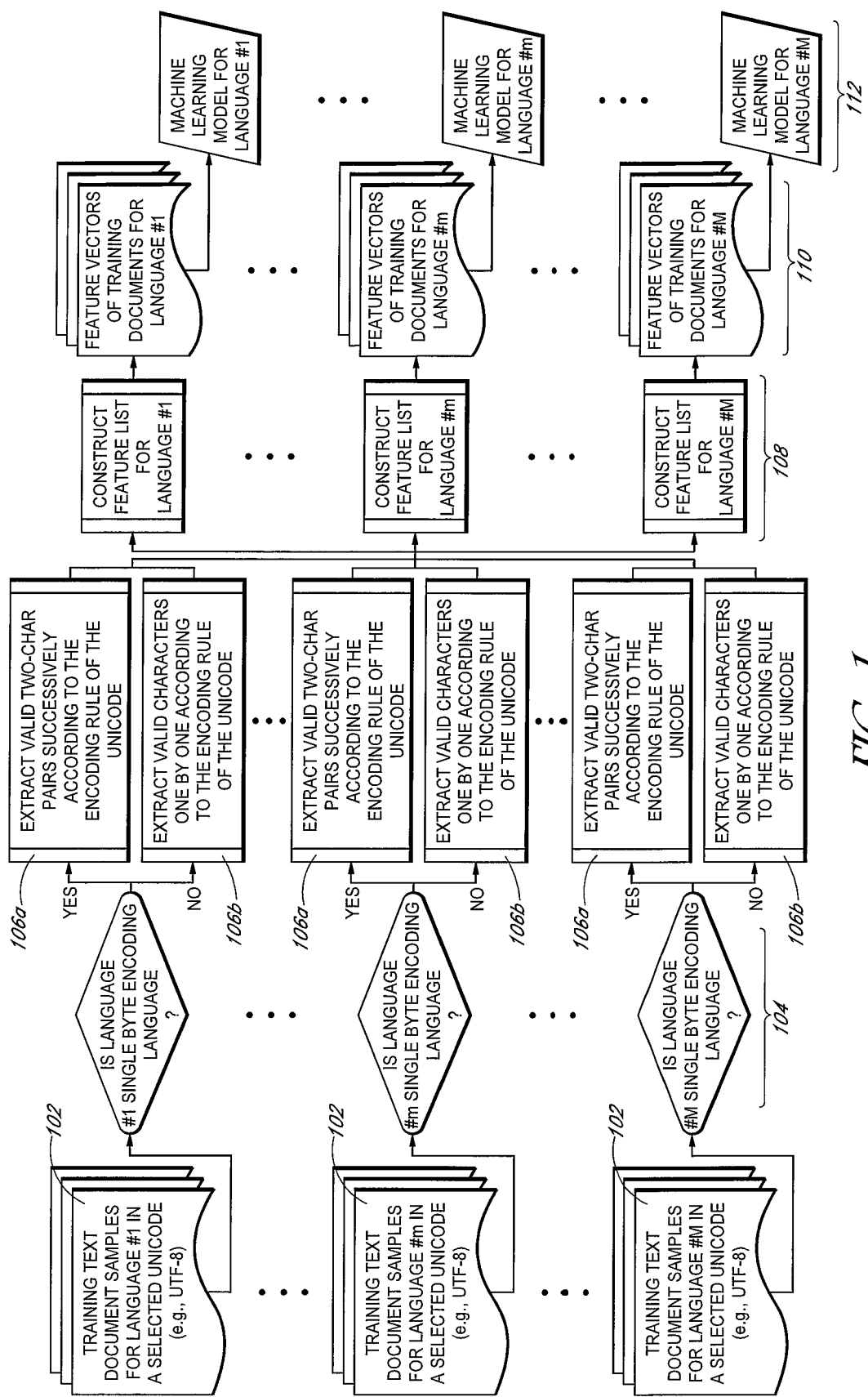
FIG. 1 shows, in accordance with an embodiment, the training stage in which a plurality of language-based machine learning models are established from a plurality of sample documents in different languages.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In embodiments of the invention, there are provided language-based automatic charset/language detection (ACLD) techniques for automatically detecting the language and the charset (encoding scheme) of any received document. The techniques herein are language-based in that machine learning models are established for sample languages instead of for charsets. As will be shown later herein, a language-based machine learning approach substantially simplifies the problem of automatically detecting the charset and the language of any given received document.

With respect to terminology, the terms charset, encoding, and encoding scheme are used interchangeably in this disclosure. Further, the terms feature and feature list are used interchangeably. As a clarification, the term fundamental units may refer to two character pairs (for Single Byte Encoding Language) or single valid characters (for Multi-Byte Encoding Language).

Generally speaking, embodiments of the invention involve a training stage and an application stage. The training stage involves establishing machine-learning models for different languages based on training samples in those languages. In an embodiment, in the training stage, a plurality of sample documents, which are in different languages and which are encoded using a selected Unicode (e.g., UTF-8), are provided. Since the approach is language-based instead of charset-based, it is not necessary to obtain sample documents for every possible charsets in every possible language. Instead, all sample documents are in the selected Unicode style, albeit in different languages. These sample documents are then processed to obtain a plurality of machine learning models, each being associated with a language. The processing during the training stage will be discussed in details later herein.

In the application stage, the charset and the language of the received document are ascertained with the assistance of the machine learning models established in the training stage. Generally speaking, the received text document is assumed to be encoded in a candidate charset style and assumed to be created in a candidate language. The received text document is then processed in accordance with the aforementioned charset/language assumption against to facilitate testing for its similarity with the language-based machine learning model for the candidate language. The processing continues with other charset/language assumptions and tested for similarity in the same manner against the machine learning model of the assumed language in each case in order to calculate the similarity score. The language and charset associated with the highest similarity score are then deemed as the language and charset of the received document.

More specifically, in an embodiment, the received text document is first converted from the candidate charset into the selected Unicode style, using conversion rules applicable to that candidate charset and the selected Unicode. The resultant Unicode-style received document is then processed against the candidate languages. In an embodiment, the Unicode-style received document is processed to obtain a vector for a particular language (e.g., French), which vector may then be compared against the French machine learning model established during the training stage to compute a similarity score. The same process repeats for all candidate languages until all languages are exhausted. Furthermore, the process above repeats for all candidate charsets so that all permutations of charsets/languages are tested and their similarity scores computed. The candidate charset and candidate language associated with the highest similarity score are selected to be the charset and language of the received text document.

The invention may be better understood with reference to the figures and drawings that follow. In machine learning, intelligent algorithms aim to extract and summarize hidden knowledge from data. This approach has proven, in many cases, to be more powerful than simple statistic approaches in revealing the true characteristics of objects. Classification is an example. Machine learning approaches (such as SVM (Support Vector Machines), decision trees etc.) can establish models for different classes to represent the classes by extracted characteristics (the Train Stage), thus obtaining a precise mechanism to evaluate the similarities between the classes and any given sample data (the Application Stage). With machine learning approaches, we can establish machine learning model for each target class (for example, language), which can extract not only statistical information of that class but also some hidden knowledge that cannot be found by statistical approaches. Class, or category, is the terminology in machine learning or pattern recognition for describing the groups of objects or events with distinctive characteristics. For language-based machine learning, a "class" refers to a language.

FIG. 1 shows, in accordance with an embodiment, the training stage in which a plurality of language-based machine learning models are established from a plurality of sample documents in different languages. There are detailed descriptions for machine learning procedures in the context of charset-based machine learning in a commonly assigned, co-pending patent application entitled "SUPPORT VECTOR MACHINES IN AUTOMATIC CHARSET DETECTION," filed by inventors Lili Diao and Yun-Chian Cheng on even date herewith (U.S. application Ser. No. 11/238,478, and a commonly assigned, co-pending patent applications entitled "SIM ALGORITHM IN AUTOMATIC CHARSET DETECTION," filed by inventor Lili Diao on even date herewith (U.S. application Ser. No. 11/238,349, both of which are incorporated by reference herein. It should be noted that the machine learning procedures discussed in the aforementioned patent applications are Charset-based, which means a "class" equals to a "Charset" in their settings. Thus, for example, the machine learning models in the aforementioned patent applications are extracted for "Charsets" not for "Languages". In the present application, a "class" equals to a "language". The infra-structures of the machine learning procedure discussed in the aforementioned patent applications are applicable to language-based machine learning of embodiments of the present invention.

Referring back to FIG. 1, in step 102, a plurality of sample documents in the selected Unicode style (e.g., UTF-8) in different languages are provided. Generally speaking, due to the language-based identification (classification) approach of embodiments of the invention, language models are selected as the basis for the machine learning approach instead of charset models. In so doing, the training stage is substantially simplified.

To elaborate, suppose there are N possible charsets and M possible languages for any given received document. By adopting the language-based classification approach, it is not necessary to obtain samples for every charset and every language (i.e., O(N*M) categories of text document samples). Instead, a Unicode style is selected, and the sample documents covering different languages may all be encoded in that selected Unicode style. Thus, the number of documents samples is reduced from O(N*M) categories of text document samples to simply O(M) categories. In an embodiment, if the sample document for a particular language (e.g., Korean) cannot be found in the selected Unicode style (e.g., UTF-8), a sample for that particular language encoded using a different charset (e.g., EUC-KR) may be furnished to indirectly create the desired sample document in the selected Unicode style. In this example, the EUC-KR sample document may be converted to the selected UTF-8 Unicode style using conversion rules applicable to the EUC-KR and UTF-8, thus resulting in the desired sample document for that language (e.g., Korean), which desired sample document is now in the selected Unicode style (e.g., UTF-8).

In step 104, it is ascertained whether the language associated with this sample document is a Single Byte Encoding Language (SBEL) or a Multi-Byte Encoding Language (MBEL). SBELs represents languages that employ a small number of distinct characters (typically much less than 128) to represent it. For example, French, Spanish, German are considered SBELs and are encoded in single-byte charsets. MBELs on the other hand represent languages that have may a larger number of characters and are encoded by two-byte or more charsets. MBELs can distinguish themselves well by a single character. For example, many East Asian languages such as Chinese, Korean, Japanese, etc., are MBELs.

Unlike MBEL, SBEL cannot distinguish itself well using a small number of characters. Studies have shown that two-char sequence pairs of a SBEL tend to have strong connection with characteristics of the specific SBEL. Accordingly, two-character sequence pairs of a SBEL may be considered fundamental units for distinguishing that SBEL from other languages. MBEL, on the other hand, may employ a single character as the fundamental unit for distinguishing that MBEL from other languages. Note that although SBELs may be encoded by multi-byte charsets (such as UTF-8, etc.), they are still referred to herein as Single-Byte Encoding Languages, or SBELs.

In step 106a, if the language associated with the sample is SBEL, two-character sequence pairs are extracted as fundamental units for distinguishing purposes. If the language associated with the sample is MBEL, single characters may be extracted as fundamental units for distinguishing purposes (step 106b).

Once the fundamental units are extracted from the sample documents (i.e., two-char sequence pairs for a SBEL and single valid characters for a MBEL), machine learning models may then be established for the different languages. In step 108, a feature list for each language is selected from the extracted fundamental units. The feature list may represent a common feature list for all languages of the sample documents, or there may be a distinctive feature list for each language. In an embodiment, a distinctive feature list is selected for each language since the relatively small efficiency penalty associated with this approach during the training stage and the subsequent application stage is outweighed by the gain in precision. In selecting the feature list for a particular language, training text sample(s) associated with that language are considered positive samples and all other training text samples are considered negative samples. In performing feature selection, the fundamental units that can best discriminate the characteristics among different classes (languages or negative/positive categories) are selected.

At this point, there exist two choices: selecting a single common feature list for all the languages, or selecting distinctive feature list for each language respectively. In a preferred embodiment, a distinctive feature list is selected for each language. Although such a choice (i.e., different feature lists for different languages) may involve some efficiency drop, the use of a distinctive feature list for each language is more representative of the problem and leads to higher precision in most cases. At any rate, in the application stage, such efficiency drop may be trivial in relation to the gain in precision and/or the overall process.

In selecting a distinctive feature list for each language respectively, with respect to the selection of a feature list for any language, the training text documents belonging to a particular language may be considered as positive samples, and all other documents as negative samples. As discussed, the fundamental units that can best discriminate the characteristics among different classes (languages or negative/positive categories) are selected. In so doing, different feature lists for language #1, language #2 . . . to language #M, are selected.

Once the feature list for a language is selected, all training text samples associated with that language may then be converted into vectors by some vector representation technique (step 110). In an embodiment, the TF-IDF (Term-Frequency-Inverse Document Frequency) approach is employed to construct VSM (Vector Space Model) vectors for each document. Each of the elements in the VSM vectors is a real value corresponding to a specific feature (i.e., fundamental unit for distinguishing, which may be one character or two characters as discussed). TF-IDF thus provides an exact value for such element to estimate the importance of its corresponding feature item with regards to the specific document in which the feature item appears. Although TF-IDF is employed in an embodiment, other vector representation techniques, such as BOOL models, may also be employed as alternatives. Whereas TF-IDF representation approach employs real value (0,1) to evaluate the importance of each feature for a specific document for setting each elements of feature vectors, BOOL modeling employs 0/1 values as the elements of feature vectors. For example, if a feature appears in the given document, in the setting of BOOL model, its corresponding element in the feature vector of this document is 1, otherwise 0.

The training vectors for the different languages may then be employed to establish machine learning models for each language (step 112). In establishing machine learning models, there are two choices: establishing a single common multi-class (language) machine learning model, or establishing a distinctive machine learning model for each class (language). The choice depends on the machine learning algorithm employed and the choice made in the feature selection step 108. For example, if a distinctive feature list is selected for each language earlier, then the machine learning models are established to be distinctive for each class (language) since the representation of each language is different from other languages. On the other hand, if a single common feature list is selected for all languages earlier, a single common multi-class (language) machine learning model for all languages may be established, especially if the machine learning algorithm can support direct multi-class categorization. However, in this case we still can choose to establish distinctive machine learning model for each class (language) respectively. This approach is particularly useful when a machine learning algorithm cannot support direct multi-class categorization.

In an embodiment, to establish distinctive machine learning model for each class (language) respectively, for each language, all sample documents and converted vectors associated with that given language are considered positive samples, and all other documents and converted vectors associated with other languages are considered negative samples for categorization purposes. Machine learning algorithms can then be employed to solve 2-class categorization problems and establish the distinctive machine learning models for different languages. In this case, the problem may be divided into many 2-class sub-problems, which may then be processed by the machine learning algorithm to establish different machine learning models. In an example embodiment, a distinctive machine learning model is established for each language.

As mentioned earlier, the application stage detects the charset and the language of a received document with the aid of the machine learning models established in the training stage. The reader is invited to read the two aforementioned applications, which are incorporated by reference herein, for further information regarding the computation of similarity scores during the application stage.

Generally speaking, the received document with unknown charset/language is first assumed to be encoded with a particular charset. The received document is then converted from the assumed charset style (e.g., GB2312) to the selected Unicode style (e.g., UTF-8) using the conversion rules applicable for converting from the assumed charset style (e.g., GB2312) to the selected Unicode style (e.g., UTF-8).

Once the received document is converted to the selected Unicode style, the converted Unicode received document is processed against the feature lists and machine learning models associated with different languages to ascertain a similarity score with each of the languages (as represented by the associated machine learning models). After the converted Unicode received document is processed against all machine learning models, the loop repeats with a different assumed charset. That is, the received document is converted from the next assumed charset to the selected Unicode style and processed against all machine learning models again to obtain similarity scores. The process continues until all assumed charsets are exhausted.

The result is a plurality of similarity scores covering all assumed charsets and all languages. The charset and language associated with the highest similarity score is selected to be the charset and language of the received document.

Figure 2:
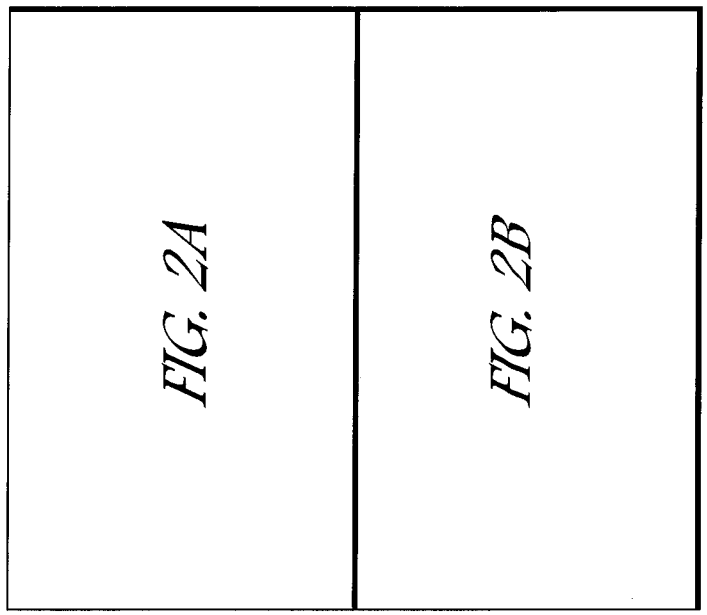
FIG. 2, which consists of FIGS. 2A and 2B, shows the application stage in greater details, in accordance with an embodiment of the invention.
Figure 2A:
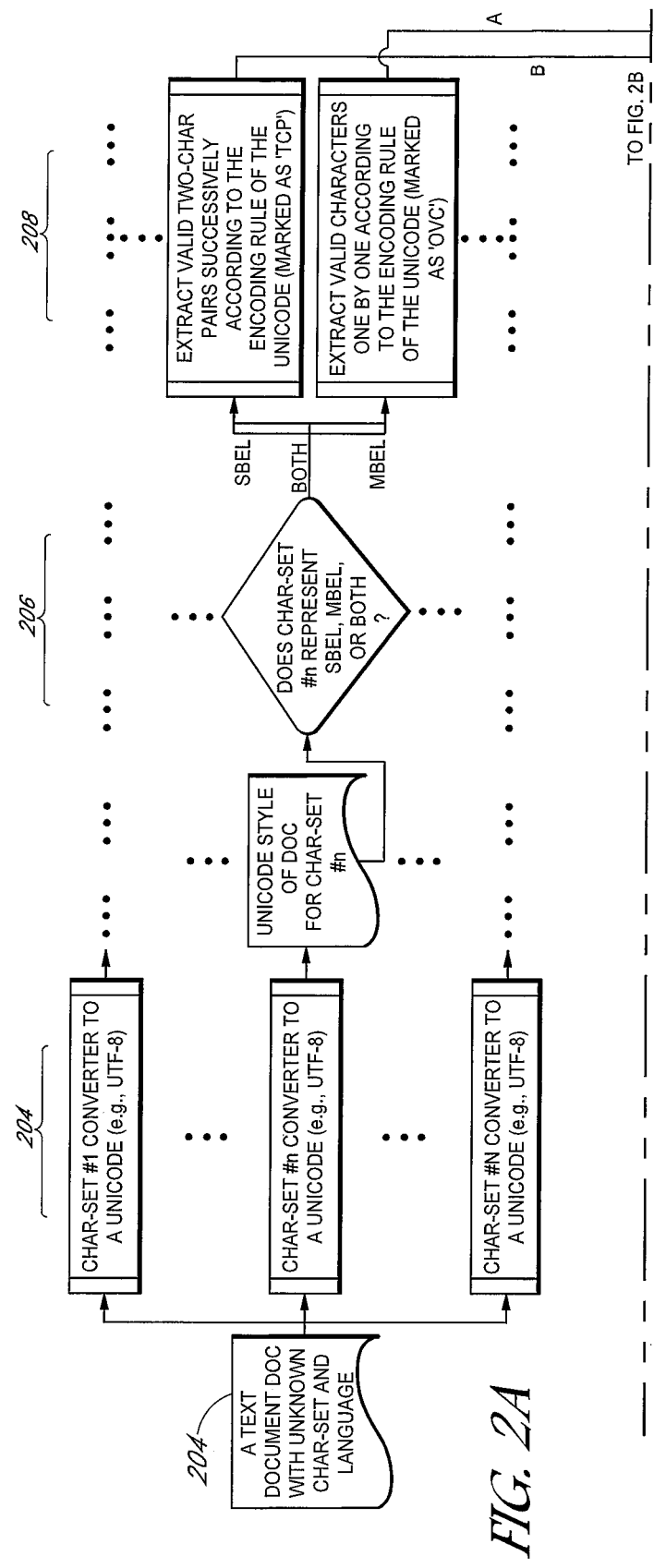
Figure 2B:
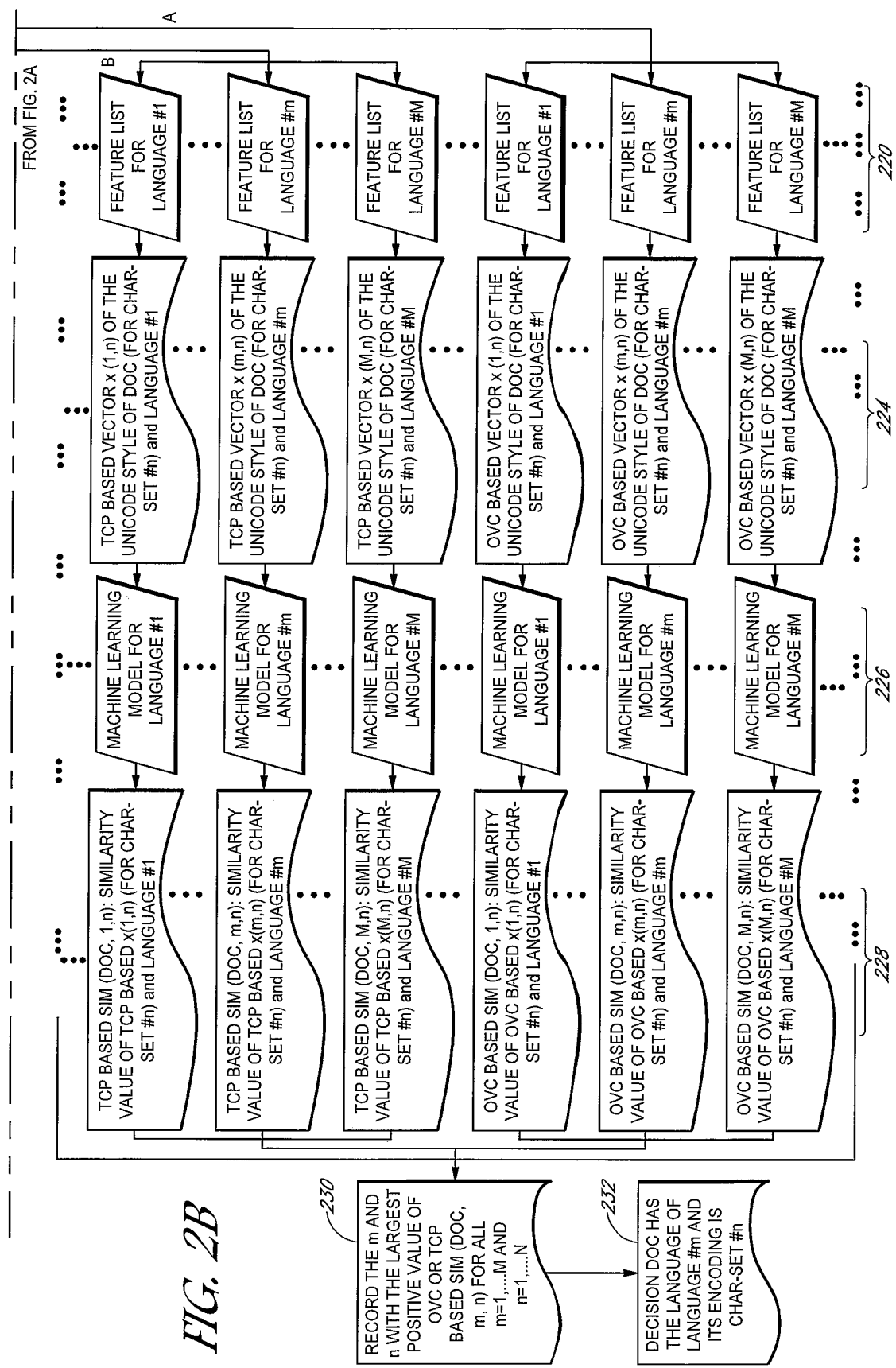

FIG. 2 shows the application stage in greater details, in accordance with an embodiment of the invention. In step 202, a received document encoded with an unknown charset and in an unknown language is received. In step 204, the received document is associated with different assumed charsets and converted to a plurality of converted Unicode-style documents using the conversion rules associated with the different charsets and the selected Unicode style. For example, suppose the detection system is provided with the capability to detect among N charsets. For n=1, . . . , N, the received document is converted from assumed charset #n to the selected Unicode style. The result from this operation is the creation of at least N converted Unicode style documents, each being converted to the selected Unicode style from a different assumed charset.

For each charset #n, the converted Unicode style document is processed against all possible language-based machine learning models to obtain similarity scores. Thus, in step 206, it is ascertained whether the charset #n represents a Single Byte Encoding Language (SBEL) or a Multi-Byte Encoding Language (MBEL) or both. As discussed, some charsets represent SBELs (e.g., ISO8859 represents SBELs such as French, Spanish, German, etc.). Other charsets represent only MBELs (e.g., GB2312 represents only Simplified Chinese). There are also charsets that represent both SBELs and MBELs. For example, Unicode may represent both Spanish (a SBEL) and Chinese Simplified (a MBEL).

Depending on the result of step 206, the fundamental units of the received document are extracted accordingly (step 208). For example, if the charset #n represents only SBELs, two-character pairs are extracted successively and employed as fundamental units for the received document that is assumed to be encoded with charset #n (designated with the label "TCP" in FIG. 2). On the other hand, if the charset #n represents only MBEL, valid characters are extracted one by one and employed as fundamental units for the received document that is assumed to be encoded with charset #n (designated with the label "OVC" in FIG. 2). If, in the alternative, the charset #n can represent both SBEL and MBEL, the extraction of fundamental units is attempted with both two-character pair extraction and single valid character extraction.

Once fundamental unit extraction is completed, the similarity scores are computed against all language models for this charset #n (Note: some charset/language combinations do not exist. Thus in an embodiment, for this charset #n, the test is made against languages that are applicable to that charset #n, which may be fewer than the total number of languages handled by the detection system). For each language m=1, . . . , M, perform the following steps:

(1) Retrieve the feature list of language #m (step 220). Note that if the feature list is a common feature list for all languages (as decided in the training stage), the feature list is the same for all languages 1 through M. On the other hand, if the feature list is a distinctive feature list to each language, the distinctive feature list for language #m is retrieved.

(2) Convert the extracted fundamental units to vectors according to the feature list retrieved for language #m (step 224). The converted vector is denoted x(m,n), which represents the converted Unicode version of the received document for charset #n and for language #m.

(3) Retrieve the machine learning model (step 226) for language #m (which was created during the training stage). Note that if the machine learning model is a common machine learning model for all languages (as decided in the training stage), the retrieved machine learning model is the same for all languages 1 through M. On the other hand, if the machine learning model is a distinctive machine learning model to each language, the distinctive machine learning model for language #m is retrieved.

(4) Calculate the similarity value between vector x (m,n) and the language model for language #m (step 228). This similarity value may be denoted Sim (Doc, m, n) in that it is the similarity between language #m (as represented by the machine learning model for language #m) and the converted Unicode version of the received document Doc for assumed charset #n (as represented by vector x(m,n)).

The similarity values are calculated for all m=1, . . . , M for the converted Unicode version of the received document Doc for a given assumed charset #n. These similarity values are stored for later comparison. The process continues for other assumed charsets in the range of n=1, . . . , N. The end result is a plurality of similarity values Sim (Doc, m, n) for all assumed charsets and all languages. The highest similarity score is then ascertained, and the value of m and n are obtained for that highest similarity value (step 230). The charset n and the language m associated with that highest similarity score are selected as the charset and language for the received document (step 232).

As can be appreciated from the foregoing, embodiments of the invention substantially simplify the task of automatically detecting the charset and the language of a received document by not having to incur the cost of a two-level identification (i.e., first identifying the charset then identifying the language). The disclosed approach (i.e., assuming that the received document is encoded with a given charset for the purpose of converting to the selected Unicode style document and comparing the extracted fundamental units of that received document against the training-stage language-based machine learning models) in essence reduces a two-dimensional problem (i.e., identifying the charset then identifying the language) to a one-dimensional problem as far as the training and the application stages are concerned.

Furthermore, the inventive approach herein simplifies the task of finding sample documents since the training stage only requires Unicode-style documents in different languages, which Unicode style documents can be obtained directly or indirectly via a conversion process from another charset style. As such, it is not necessary to find samples for all different charsets and all different languages.

Additionally, embodiments of the invention render it easy to add new charsets and new languages to the detection system to expand the capability of the detection system. The inventor herein also believes that the language-based machine learning model is inherently more stable (as languages do not change quickly or substantially over time) as well as more precise in the automatic charset and language detection process.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for automatically detecting a received document charset and a received document language of a received document, comprising:

training, using a plurality of text document samples that are in a plurality of languages, to generate a set of machine learning models, said training including converting documents of said plurality of text documents samples to a selected Unicode style if said documents of said plurality of text documents are not already in said selected Unicode style;

performing an application stage, including processing said received document to ascertain said received document charset and said received document language using said set of machine learning models, said processing including (a) converting said received document to said selected Unicode style from an assumed charset, (b) for each particular combination of said assumed charset and one of said plurality of languages that is applicable to said assumed charset, computing a similarity indicia between a vector representation of said received document for said each particular combination and a machine language model of said set of machine learning models that pertains to said one of said plurality of languages, whereas said computing is performed iteratively for each of said plurality of languages that is applicable to said assumed charset, and (c) repeating steps (a) and (b) for all charsets until all combinations of said charsets and their respective applicable languages are processed, thereby obtaining a set of similarity indicia for different combinations of said charsets and their respective applicable languages, whereby the charset and language combination associated with the most similar similarity indicia is designated said received document charset and said received document language.

2. The method of claim 1 wherein said training includes indirectly obtaining a given one of said plurality of text document samples by converting from another text document sample, said another text document sample having the same language as said given one of said plurality of text document samples albeit encoded using a different charset from a charset associated with the language of said given one of said plurality of text document samples.

3. The method of claim 1 wherein said training including ascertaining whether a given language of said plurality of languages is a Single Byte Encoding Language (SBEL) or a Multi-Byte Encoding Language (MBEL).

4. The method of claim 3 further comprising extracting two-character sequence pairs from a given text document sample of said plurality of text document samples as fundamental units if said given text document sample is in said given language and if said given language is deemed said Single Byte Encoding Language (SBEL).

5. The method of claim 4 further comprising selecting a subset of fundamental units from said fundamental units, said subset of fundamental units representing a set of feature lists and representing fundamental units that are more discriminatory in describing characteristics among said plurality of languages.

6. The method of claim 5 wherein said selecting said subset of fundamental units, when performed for said plurality of text document samples, results in a single common feature list for said plurality of languages.

7. The method of claim 5 wherein said selecting said subset of fundamental units, when performed for said plurality of text document samples, results in a distinctive feature list for each of said plurality of languages.

8. The method of claim 5 wherein said training further includes converting, using a vector representation technique, said plurality of text document samples according to said set of feature lists to a set of feature vectors that are employed to establish said set of machine learning models.

9. The method of claim 8 wherein said vector representation technique represents one of TF-IDF (Term-Frequency Inverse Document Frequency) and BOOL modeling.

10. The method of claim 3 further comprising extracting single valid characters from a given text document sample of said plurality of text document samples as fundamental units if said given text document sample is in said given language and if said given language is deemed said Multi-Byte Encoding Language (MBEL).

11. The method of claim 10 further comprising selecting a subset of fundamental units from said fundamental units, said subset of fundamental units representing a set of feature lists and representing fundamental units that are more discriminatory in describing characteristics among said plurality of languages.

12. The method of claim 11 wherein said selecting said subset of fundamental units, when performed for said plurality of text document samples, results in a single common feature list for said plurality of languages.

13. The method of claim 11 wherein said selecting said subset of fundamental units, when performed for said plurality of text document samples, results in a distinctive feature list for each of said plurality of languages.

14. The method of claim 11 wherein said training further includes converting, using a vector representation technique, said plurality of text document samples according to said set of feature lists to feature vectors that are employed to establish said set of machine learning models.

15. The method of claim 14 wherein said vector representation technique represents one of TF-IDF (Term-Frequency Inverse Document Frequency) and BOOL modeling.

16. The method of claim 1 wherein said computing said similarity indicia further includes ascertaining whether said assumed charset represents a Single Byte Encoding Language (SBEL) or a Multi-Byte Encoding Language (MBEL).

17. The method of claim 1 wherein computing said similarity indicia further includes extracting fundamental units from said received document, said fundamental units representing two character pairs if said assumed charset represents a Single Byte Encoding Language (SBEL), said fundamental units representing single valid characters if said assumed charset represents a Multi-Byte Encoding Language (MBEL).

18. The method of claim 17 further comprising converting said received document to a set of feature vectors using a set of feature lists associated with said plurality of languages, said set of feature lists being obtained during said training.

19. The method of claim 1 further comprising:
using said designated charset and language combination to display the received document on a screen.

20. The method of claim 1 further comprising:
using said designated charset and language combination to determine whether the received document is spam.

21. A computer-implemented method for automatically detecting a received document charset and a received document language of a received document, comprising:
(1) training, using a plurality of text document samples that are in a plurality of languages, to generate a set of machine learning models, said training including
converting documents of said plurality of text documents samples to a selected Unicode style if said documents of said plurality of text documents samples are not already in said selected Unicode style,
extracting fundamental units from said plurality of text document samples,
selecting subsets of said fundamental units to form a set of feature lists, said subsets of said fundamental units representing fundamental units that are more discriminatory in describing characteristics among said plurality of languages,
converting said plurality of text document samples into a set of feature vectors according to said set of feature lists,
establishing, using machine learning algorithms, said set of machine learning models using said set of feature vectors; and
(2) performing an application stage, including processing said received document to ascertain said received document charset and said received document language using said set of machine learning models, said processing including
(a) converting said received document to said selected Unicode style from an assumed charset,
(b) for each particular combination of said assumed charset and one of said plurality of languages that is applicable to said assumed charset, computing a similarity indicia between a vector representation of said received document for said each particular combination and a machine language model of said set of machine learning models that pertains to said one of said plurality of languages, whereas said computing is performed iteratively for each of said plurality of languages that is applicable to said assumed charset, and
(c) repeating steps (a) and (b) for all charsets until all combinations of said charsets and their respective applicable languages are processed, thereby obtaining a set of similarity indicia for different combinations of said charsets and their respective applicable languages, whereby the charset and language combination associated with the most similar similarity indicia is designated said received document charset and said received document language.

22. The method of claim 21 wherein said training includes indirectly obtaining a given one of said plurality of text document samples by converting from another text document sample, said another text document sample having the same language as said given one of said plurality of text document samples albeit encoded using a different charset from a charset associated with the language of said given one of said plurality of text document samples.

23. The method of claim 21 wherein said training including ascertaining whether a given language of said plurality of languages is a Single Byte Encoding Language (SBEL) or a Multi-Byte Encoding Language (MBEL).

24. The method of claim 21 wherein said computing said similarity indicia further includes ascertaining whether said assumed charset represents a Single Byte Encoding Language (SBEL) or a Multi-Byte Encoding Language (MBEL).

25. The method of claim 21 further comprising converting said received document to a set of received document feature vectors using said set of feature lists associated with said plurality of languages, said set of feature lists being obtained during said training.

26. The method of claim 21 further comprising:
using said designated charset and language combination to display the received document on a screen.

27. The method of claim 21 further comprising:
using said designated charset and language combination to determine whether the received document is spam.

28. A computer-implemented method for automatically detecting a received document charset and a received document language of a received document, comprising:
training, using a plurality of text document samples that are in a plurality of languages, to generate a set of language-based machine learning models for said plurality of languages, said training including converting documents of said plurality of text documents samples to a selected Unicode style if said documents of said plurality of text documents are not already in said selected Unicode style, and generating said set of language-based machine learning models from selected Unicode-style version of said plurality of text document samples; and
performing an application stage, including processing said received document to ascertain said received document charset and said received document language using said set of machine learning models, said processing including testing vector representations of said received document for different combinations of charsets and their applicable languages against said set of language-based machine learning models to ascertain the charset and language combination that is most similar to its associated machine learning model.

29. The method of claim 28 wherein said training includes indirectly obtaining a given one of said plurality of text document samples by converting from another text document sample, said another text document sample having the same language as said given one of said plurality of text document samples albeit encoded using a different charset from a charset associated with the language of said given one of said plurality of text document samples.

30. The method of claim 28 wherein said training including ascertaining whether a given language of said plurality of languages is a Single Byte Encoding Language (SBEL) or a Multi-Byte Encoding Language (MBEL).

31. The method of claim 30 further comprising extracting two-character sequence pairs from a given text document sample of said plurality of text document samples as fundamental units if said given text document sample is in said given language and if said given language is deemed said Single Byte Encoding Language (SBEL).

32. The method of claim 30 further comprising extracting single valid characters from a given text document sample of said plurality of text document samples as fundamental units if said given text document sample is in said given language and if said given language is deemed said Multi-Byte Encoding Language (MBEL).

33. The method of claim 28 further comprising:
using said designated charset and language combination to display the received document on a screen.

34. The method of claim 28 further comprising:
using said designated charset and language combination to determine whether the received document is spam.

* * * * *